US012659681B2

(12) United States Patent
Cote et al.

(10) Patent No.: US 12,659,681 B2
(45) Date of Patent: Jun. 16, 2026

(54) SYSTEM AND METHOD FOR MONITORING AUDIO SIGNALS

(71) Applicant: Stingray Group Inc., Montreal (CA)

(72) Inventors: Philippe Cote, Montreal (CA); Etienne Houle, St-Hubert (CA); Guillaume Dallaire, Montreal (CA)

(73) Assignee: Stingray Group Inc., Montreal (CA)

( * ) Notice: Subject to any disclaimer, the term of this patent is extended or adjusted under 35 U.S.C. 154(b) by 0 days.

(21) Appl. No.: 18/721,434

(22) PCT Filed: Aug. 10, 2023

(86) PCT No.: PCT/IB2023/058097

§ 371 (c)(1),
(2) Date: Jun. 18, 2024

(87) PCT Pub. No.: WO2024/033864

PCT Pub. Date: Feb. 15, 2024

(65) Prior Publication Data

US 2025/0240586 A1 Jul. 24, 2025

Related U.S. Application Data

(60) Provisional application No. 63/370,973, filed on Aug. 10, 2022.

(51) Int. Cl.
*H04R 29/00* (2006.01)

(52) U.S. Cl.
CPC ....... *H04R 29/001* (2013.01); *H04R 2430/01* (2013.01)

(58) Field of Classification Search
CPC .......................... H04R 29/001; H04R 2430/01
USPC ...................................................... 381/58, 59
See application file for complete search history.

(56) References Cited

U.S. PATENT DOCUMENTS

| | | | |
|---|---|---|---|
| 2013/0044889 A1 | 2/2013 | Jensen | |
| 2014/0003625 A1 | 1/2014 | Sheen | |
| 2017/0206776 A1 | 7/2017 | Linder | |
| 2021/0012788 A1 * | 1/2021 | Karimian Azari | G08B 29/18 |

FOREIGN PATENT DOCUMENTS

| | | |
|---|---|---|
| CA | 3080979 | 1/2021 |
| KR | 20120056518 | 6/2012 |

OTHER PUBLICATIONS

International Search Report and Written Opinion mailed November, 1, 2023 in PCT/IB2023/058097, 14 pages.

* cited by examiner

*Primary Examiner* — Ammar T Hamid
(74) *Attorney, Agent, or Firm* — Blueshift IP; Robert Plotkin

(57) ABSTRACT

There is provided a system for monitoring audio signals. The system comprises an audio player for generating an initial audio signal to be played back, an audio amplifier for receiving the initial audio signal and amplifying the initial audio signal to obtain an amplified audio signal, a speaker for playing back the amplified audio signal, a sensor for measuring the amplified audio signal concurrently to said playing back the amplified audio signal in order to obtain a sensed audio signal and a processing unit. The processing unit is configured for comparing the sensed audio signal and the initial audio signal together to obtain a comparison result and outputting the comparison result.

20 Claims, 4 Drawing Sheets

SYSTEM AND METHOD FOR MONITORING AUDIO SIGNALS

CROSS-REFERENCE TO RELATED APPLICATIONS

The present application claims priority on U.S. Provisional Patent Application No. 63/370,973 filed on Aug. 10, 2022.

TECHNICAL FIELD

The present technology relates to the field of systems and methods for monitoring audio signals, and more particularly systems and methods comparing played back audio signals with initial audio signals.

BACKGROUND

Audio content is often played in public spaces for various uses. One can think of speakers playing flight status announcements in an airport, music and/or advertisements in a mall or a store, a radio channel in a waiting room and/or the like. As the background noise generated by the crowd generally varies during the day, a person responsible for playing the audio content consequently adjusts the volume thereof using an amplifier so that the audio content can be heard while not being too loud. Yet, oftentimes the person responsible tends to forget adjusting the volume when the background noise is loud, which prevents people from hearing the audio content. In several situations, this may be problematic, as people may miss their flight or fail to hear their name in a waiting room when the volume of the audio content is too low. In another perspective, it would be of interest for companies paying for playing their advertisements in public spaces that these advertisements be heard by the crowd.

Therefore, there is a need for improved systems and methods for monitoring audio signals.

SUMMARY

Embodiments of the present technology has been developed based on the inventors' appreciation that there is a need for monitoring audio signals in order to ensure that an initial audio signal intended to be played back within an environment was actually played back and to ensure that the played back audio signal was intelligibly heard by people present within the environment.

In accordance with a broad aspect of the present technology, there is provided a system for monitoring audio signals, the system comprising: an audio player for generating an initial audio signal to be played back: an audio amplifier for receiving the initial audio signal and amplifying the initial audio signal to obtain an amplified audio signal: a speaker for playing back the amplified audio signal: a sensor for measuring the amplified audio signal concurrently to said playing back the amplified audio signal in order to obtain a sensed audio signal; and a processing unit for: comparing the sensed audio signal and the initial audio signal together to obtain a comparison result; and outputting the comparison result.

In one embodiment, the audio player comprises a memory containing a plurality of pre-recorded audio signals and the audio player is configured for selecting the initial audio signal from the plurality of pre-recorded audio signals.

In one embodiment, the sensor comprises an analog-digital converter.

In one embodiment, the sensor is attachable to an electrical cable connecting the audio amplifier and the speaker together for measuring the amplified audio signal propagating along the electrical cable.

In one embodiment, the sensor comprises a current transformer.

In one embodiment, the sensor comprises a split-core transducer.

In one embodiment, the sensor is configured to be connected to an output of the audio amplifier for measuring the amplified audio signal outputted by the audio amplifier.

In one embodiment, the step of comparing the sensed audio signal and the initial audio signal comprises comparing a first spectral content of the sensed audio signal and a second spectral content of the initial audio signal.

In one embodiment, the comparison result comprises a comparison score.

In one embodiment, the step of comparing is performed using an intelligibility algorithm to obtain the comparison score.

In one embodiment, the intelligibility algorithm comprises a short-time objective intelligibility algorithm.

In one embodiment, the audio player is further configured for receiving the comparison result from the processing unit and modifying a content of at least one of the initial audio signal and a further audio signal to be played back based on the comparison result.

In one embodiment, the audio player is further configured for receiving the comparison result from the processing unit and controlling the audio amplifier based on the comparison result.

In one embodiment, the processing unit is further configured for controlling the audio amplifier based on the comparison result.

In accordance with another broad aspect, there is provided a method for monitoring audio signals, the method comprising: generating an initial audio signal to be played back: amplifying the initial audio signal, thereby obtaining an amplified audio signal: concurrently playing back the amplified audio signal and measuring the amplified audio signal, thereby obtaining a sensed audio signal: comparing the sensed audio signal and the initial audio signal together, thereby obtaining a comparison result; and outputting the comparison result.

In one embodiment, the step of generating is performed by selecting the initial audio signal from a plurality of pre-recorded audio signals.

In one embodiment, the step of measuring is performed using an analog-digital converter.

In one embodiment, the step of measuring is performed using a current transformer.

In one embodiment, the step of measuring is performed using a split-core transducer.

In one embodiment, the step of comparing the sensed audio signal and the initial audio signal comprises comparing a first spectral content of the sensed audio signal and a second spectral content of the initial audio signal.

In one embodiment, the comparison result comprises a comparison score.

In one embodiment, the step of comparing is performed using an intelligibility algorithm to obtain the comparison score.

In one embodiment, the intelligibility algorithm comprises a short-time objective intelligibility algorithm.

In one embodiment, the method further comprises modifying a content of at least one of the initial audio signal and a further audio signal to be played back based on the comparison result.

In one embodiment, the method further comprises controlling said amplifying the initial audio signal based on the comparison result.

The systems and methods presented herein provide various advantages. For instance, the present technology enables the detection of any form of tampering on the amplification of audio signals, and so by using a versatile and easy-to-use sensor connectable to an amplifier or attachable to an electrical cable. Also, the use of a score well suited to reflect the relationship between an initial signal and a played back signal makes possible to efficiently monitor any tampering made in the amplification process.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
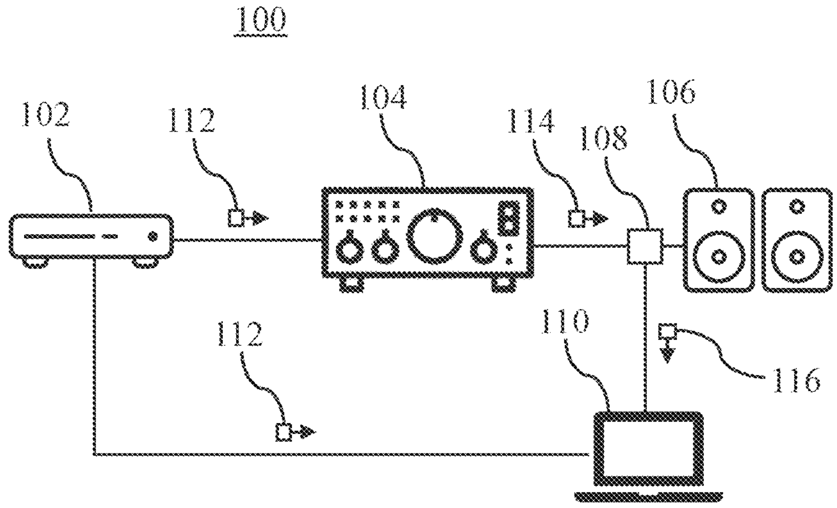
FIG. 1 is a diagram of a system for monitoring audio signals, in accordance with a first non-limiting embodiment.

FIG. 1 illustrates a non-limiting embodiment of a system 100, the system 100 being suitable for implementing one or more non-limiting embodiments of the present technology.

In at least some embodiments, the system 100 is configured for amplifying and playing back an initial audio signal 112 and comparing the played back audio signal with the initial audio signal 112 to obtain a comparison result.

The system 100 comprises an audio player 102, an audio amplifier or audio power amplifier 104, at least one speaker 106, a sensor 108 and a processing unit 110.

The audio player 102 is operatively connected to the audio amplifier 104 which is connected to the speaker 106. The audio player 102 is configured for generating an initial audio signal 112. The audio amplifier 104 is operatively connected to the audio player 102 for receiving the initial audio signal 112 therefrom and is configured amplifying the initial audio signal 112 to obtain an amplified audio signal 114. The speaker 106 is operatively connected to the audio amplifier 104 for receiving the amplified audio signal 114 therefrom and is configured for playing back the amplified audio signal 114. The sensor 108 is configured for measuring the amplified audio signal 114 transmitted by the audio amplifier 104 to the speaker 106 to obtain a measured or sensed signal 116. The processing unit 110 is operatively connected to the audio player 102 for receiving the initial audio signal 112 therefrom and to the sensor 108 for receiving the sensed signal 116 therefrom. The processing unit 110 is configured for comparing the initial audio signal 112 and the sensed signal 116 together to obtain a comparison result, as described in greater detail below.

The audio player 102 is configured for generating the initial audio signal 112 to be played back and transmitting the initial audio signal 112 to the audio amplifier 104. It should be understood that any adequate connection for operatively connecting together the audio player 102 and the audio amplifier 104 may be used. For example, an electrical connection may be used for connecting For example, an electrical cable may be used for connecting together the audio player 102 and the audio amplifier 104. The electrical cable may be a Radio Corporation of America (RCA) cable or a HDMI cable, for instance. In another embodiment, the audio player 102 is configured to generate an electromagnetic signal representative of the initial audio signal 112 to be played back. In this case, the audio player 102 may be configured for transmitting the electromagnetic initial signal to the audio amplifier 104 via an optic fiber cable for example. In another embodiment, the audio player 102 and the audio amplifier 104 may be wirelessly connected together. In this case, a Wi-Fi™ or a Bluetooth™ connection may be used. It will be understood that the means for transmitting the initial audio signal 112 from the audio player 102 to the audio amplifier 104 may vary.

It should also be understood that the audio player 102 may be any adequate device adapted to convert a digital audio signal into an electric and/or electromagnetic signal representative of the digital audio signal. For example, the audio player 102 may be a digital audio player, a computer, a laptop, a smartphone, a tablet, a disc player, or the like.

In some embodiments, the audio player 102 comprises a memory having stored therein a plurality of pre-recorded audio signals. In this case, the audio player 102 is further configured for selecting the audio signal to be played back, i.e. the initial audio signal 112, amongst the pre-recorded audio signals. It should be understood that any adequate method for selecting the audio signal to be played back can be used. In one embodiment, the audio player 102 is adapted to randomly select the audio signal to be played back amongst the pre-recorded audio signals. In another embodiment, the audio player 102 is configured for selecting the audio signal to be played back according to a playback schedule or list stored on the memory. For example, the playback schedule may be represented by the order in which the pre-recorded audio signals are to be played back. In another example, the playback schedule may be stored on the memory and indicative of the time order according to which the pre-recorded audio signals must be played back for example. In another example, the playback schedule may indicate for each pre-recorded audio signal a date/time at which the pre-recorded audio signal must be played back. In a further example, the playback schedule may simply indicate a number of times over a given period of time a given pre-recorded audio signal must be played back. In another embodiment, the audio player 102 is provided with a user interface for allowing a user to selects an initial audio signal 112 to be played back from the plurality of pre-recorded audio signals.

In another embodiment, the audio player 102 is provided with a communication interface and configured for receiving the initial audio signal 112 to be played back via the communication interface from a server for example. In one embodiment, the audio player 102 is configured for generating the initial audio signal 112 to be played back upon receipt of the initial audio signal 112 so that the initial audio signal 112 be played back in substantially real-time. In another embodiment, in addition to receiving the initial audio signal 112 to be played back, the audio player 102 is further configured for receiving a playback schedule indicative of the time at which the initial audio signal 112 is to be played back.

The person skilled in the art will understand that an initial audio signal 112 generated by an audio player 102 has generally an amplitude that is too low to drive the speaker 106, and that the audio amplifier 104 is configured for amplifying the initial audio signal 112 up to an amplitude adequate for driving the speaker 106. Therefore, the audio amplifier 104 is configured for receiving the initial audio signal 112 and for increasing the amplitude of the received signal to output an amplified audio signal 114 representative of the initial audio signal 112 to be played back.

In one embodiment, the audio amplifier 104 or the settings of the audio amplifier 104 is (are) configured to provide an even gain to all frequencies, i.e., may evenly amplify the amplitude of each frequency of the initial audio signal 112. In this case, the amplified audio signal 114 substantially corresponds to the initial audio signal 112 (with an increased amplitude).

In another embodiment, the audio amplifier 104 or the settings of the audio amplifier 104 is (are) configured to modify the spectral content of the initial audio signal 112. For example, the audio amplifier 104 may provide an uneven gain to different frequencies of the initial audio signal 112 (e.g. bass amplification), add an uneven noise to the frequencies, add distortion, etc. In this case, the amplified audio signal 114 may not exactly correspond to the initial audio signal 112.

In one embodiment, the audio amplifier 104 is provided with a user interface for allowing a user to adjust parameters of the audio amplifier 104 such as the frequency response, the gain, the noise, the distortion and/or the like.

It should be understood that the speaker 106 may be any adequate electroacoustic transducer adapted to convert the amplified audio signal 114 into sound. For example, the speaker 106 may be a loudspeaker.

Referring back to FIG. 1, the sensor 108 is configured for measuring the amplified audio signal 114 transmitted to the speaker 106. In embodiments in which the audio amplifier 104 and the speaker 106 are connected together via an electrical cable, the sensor 108 is operatively connected to the electrical cable, and is configured to measure the amplified audio signal 114 propagating along the electrical cable to obtain the sensed signal 116 representative of the amplified audio signal 114. Since the propagation time of the amplified audio signal 114 along the electrical cable is substantially neglectable and the playback of the amplified audio signal 114 by the speaker 106 substantially occurs in real-time, the person skilled in the art will understand that measuring the amplified audio signal 114 is equivalent to measuring the sound emitted by the speaker 106 and the measurement of the amplified audio signal 114 by the sensor 108 is performed substantially concurrently to the playback of the amplified audio signal 114. Therefore, the sound emitted by the speaker 106 can be known at any time by monitoring any audio signal propagating along the electrical cable.

In some embodiments, the sensor 108 may comprise a current transformer. In one embodiment, the current transformer comprises a split-core transducer (SCT) which is configured to measure the amplified audio signal 114 and output the sensed audio signal 116 representative of the amplified audio signal 114. The person skilled in the art will understand that a current transformer such as a SCT is attachable to the sheath of an electrical cable without disconnecting the electrical cable from the connected components, which makes the system 100 versatile and easy to use. In one embodiment, the current transformer is coupled with an analog-digital converter. In this embodiment, the amplified audio signal 114 is analog and the sensed audio signal 116 transmitted to the processing unit 110 is digital, and the analog-digital converter is configured to convert the analog amplified audio signal 114 into the digital sensed audio signal 116.

The sensor 108 is connected to the processing unit 110 to transmit the sensed audio signal 116 thereto. In the illustrated embodiment, the processing unit 110 is also connected to the audio player 102 to receive the initial audio signal 112 therefrom.

The processing unit 110 is configured for comparing the initial audio signal 112 and the sensed audio signal 116 together and output a comparison result.

In one embodiment, the processing unit 110 is configured for determining whether the sensed audio signal 116 corresponds to the initial audio signal 112. For example, the processing unit 110 may be configured to compare the spectral components of audio signals to determine whether two audio signals are substantially identical or substantially correspond to one another. When it determines that the sensed audio signal 116 substantially corresponds to the initial audio signal 112, the processing unit 110 is configured for outputting an indication of a match, the indication of the match corresponding to the comparison result. Alternatively, when it determines that the sensed audio signal 116 does not correspond to the initial audio signal 112, the processing unit 110 is configured for outputting an indication of a mismatch, the indication of the mismatch corresponding to the comparison result.

In the same or another embodiment, the processing unit 110 is configured for comparing the sensed audio signal 116 and the initial audio signal 112 together to obtain a comparison result and to output the comparison result. In one embodiment, the comparison between the sensed audio signal 116 and the initial audio signal 112 consists in comparing the spectral content of the sensed audio signal 116 to the spectral content of the initial audio signal 112. In this case, the comparison result is indicative of the spectral content comparison.

In one embodiment, the comparison result comprises a comparison score of which the value is indicative of the resemblance of the two audio signals.

In one embodiment, the comparison score is indicative of the intelligibility of the amplified audio signal 114, i.e., is indictive of how comprehensive is the sound emitted by the speaker 106 and how much the amplified audio signal 114 corresponds to the initial audio signal 112. It should be understood that any adequate method for determining an intelligibility score from the sensed audio signal 116 and the initial audio signal 112 may be used.

In one embodiment, the comparison score is obtained by using a short-time objective intelligibility (STOI) method. An exemplary STOI method is provided in the scientific publication entitled "An Algorithm for Intelligibility Prediction of Time-Frequency Weighted Noisy Speech", by Taal et al., published in IEEE Transactions on Audio, Speech, and Language Processing, Vol. 19, No. 7, September 2011 (hereinafter "Taal et al."), which is incorporated hereby by reference. It should be understood that the processing unit 110 is then configured to execute the STOI method to obtain the comparison score.

From Taal et al., the intermediate intelligibility measure is defined by the following equation:

$$d_{j,m} = \frac{(x_{j,m} - \mu_{x_{j,m}})^T(\overline{y}_{j,m} - \mu_{\overline{y}_{j,m}})}{\|x_{j,m} - \mu_{x_{j,m}}\| \|\overline{y}_{j,m} - \mu_{\overline{y}_{j,m}}\|} \quad (1)$$

with $x_{j,m}$ being a vector representing the short-time temporal envelope of the initial audio signal 112, $\overline{y}_{j,m}$ a normalized and clipped vector representing the short-time temporal envelope of the sensed audio signal 116, $\mu_{x_{j,m}}$ and $\mu_{\overline{y}_{j,m}}$ the sample average of their corresponding vector, j a given frequency range and m a given frame. The person skilled in the art will understand that the frames m are preferably short to increase the temporal precision of the comparison score. In one embodiment, a comparison score obtained using a STOI method is defined by the following equation:

$$d = \frac{1}{JM}\sum_{j,m} d_{j,m} \quad (2)$$

with/being the quantity of frequency ranges and M the quantity of frames considered for the calculation of the comparison score. In one embodiment, the frequency ranges j cover the audio frequency range, i.e., from 20 Hz to 20,000 Hz. In another embodiment, the frequency ranges j are selected by their amplitude, and only the frequency ranges j having a defined amplitude are considered for calculating the comparison score.

In one embodiment, each frame of the initial audio signal 112 is compared with a corresponding frame of the sensed audio signal 116 for the algorithm used to provide a proper comparison score. For instance, the comparison score associated with the comparing of a sensed audio signal 116 unsynchronized with an initial audio signal 112 may be generally null, while the comparison score associated with the comparing of a sensed audio signal 116 synchronized with an initial audio signal 112 would be greater than zero.

In one embodiment, a low comparison score may be related to any form of tampering on the amplification made by the audio amplifier 104. For instance, a user may modify some parameters of the audio amplifier 104, thereby affecting the amplified audio signal 114 and therefore the sensed audio signal 116. In another example, a user may disconnect the audio player 102 from the audio amplifier 104 and connect another audio player to the audio amplifier 104. In this case, the system 100 will not play back the initial audio signal 112 and the comparison score will most likely be close to zero, thereby indicating that the initial audio signal 112 was not played back.

In one embodiment, the processing unit 110 is further configured for transmitting the comparison score to the audio player 102 which is further configured for modifying at least one control parameter of the audio amplifier 104 so that the comparison score of the next initial audio signal 112 to be played back will be improved. In another embodiment, the processing unit 110 may be configured for controlling the audio amplifier 104 to modify the amplification of the initial audio signal 112 in order to improve the comparison score. In some embodiments, the control parameters of the audio amplifier 104 that may be modified by the audio player 102 or the processing unit 110 to improve the comparison score include the gain, the frequency response, the bandwidth, the input impedance, the output impedance, the phase shift, the noise, the distortion, and/or the feedback.

In an embodiment in which the audio player 102 is configured for controlling the audio amplifier 104, the audio player 102 may be configured for randomly varying the value of at least one control parameter of the audio amplifier 104 in order to improve the comparison score. In another embodiment in which the audio player 102 is configured for controlling the audio amplifier 104, the audio player 102 may be configured for executing a control-loop method in order to improve the comparison score. It should be understood that at least one control parameter of the audio amplifier 104 is used for the control loop. The audio player 102 then receives the comparison score from the processing unit 110 and continuously or iteratively vary the value of at least one control parameter of the audio amplifier 104 to improve the comparison score.

In one embodiment, the audio player 102 is configured for varying the value of the at least one control parameter until the comparison score reaches a target value or is comprised within a target value range. In another embodiment, the audio player 102 is configured for varying the value of the at least one control parameter until the comparison score is improved by a predetermined amount or percentage.

In a further embodiment in which the audio player 102 is configured for controlling the audio amplifier 104, the audio player 102 may have stored thereon a database containing predefined comparison score values and respective values for at least one control parameter of the audio amplifier 104. In this case, the audio player 102 is configured for receiving the value of the comparison score from the processing unit 110, retrieving from the database the value for the control parameter that corresponds to the received value of the comparison score and adjusting the value of the control parameter of the audio amplifier 104 to the retrieved value. It should be understood that the database may be stored on the internal memory of the audio player or on an external memory or storing unit accessible by the audio player 102.

In an embodiment in which the processing unit 110 is configured for controlling the audio amplifier 104, the processing unit 110 may be configured for randomly varying the value of at least one control parameter of the audio amplifier 104 in order to improve the comparison score. In another embodiment in which the processing unit 110 is configured for controlling the audio amplifier 104, the processing unit 110 may be configured for executing a control-loop method in order to improve the comparison score. It should be understood that at least one control parameter of the audio amplifier 104 is used for the control loop. The processing unit 110 then continuously or iteratively varies the value of at least one control parameter of the audio amplifier 104 to improve the comparison score according to the control loop.

In one embodiment, the processing unit 110 is configured for varying the value of the at least one control parameter until the comparison score reaches a target value or is comprised within a target value range. In another embodiment, the processing unit 110 is configured for varying the value of the at least one control parameter until the comparison score is improved by a predetermined amount or percentage.

In a further embodiment in which the processing unit 110 is configured for controlling the audio amplifier 104, the processing unit 110 has access to a memory or storing unit having stored thereon a database containing predefined comparison score values and respective values for at least one control parameter of the audio amplifier 104. In this case, the processing unit 110 is configured for retrieving from the database the value for the control parameter that corresponds to the determined value of the comparison score and adjusting the value of the control parameter of the audio amplifier 104 to the retrieved value.

In one embodiment, the audio player 102 is further configured for modifying the content of the initial audio signal 112 being actually played back and/or the content of a next or further initial audio signal to be played back based on the comparison result such as the comparison score. In one embodiment in which the comparison result comprises a comparison score, the audio player 102 is configured for comparing the received comparison score to a target or predefined comparison score and modifying the content of the next initial audio signal to be played back based on the comparison of the comparison score to the target score.

It should be understood that any adequate method for sensing the amplified audio signal 114 substantially concurrently to its playback by the speaker 106 may be used. In one embodiment, the sensor 108 is activated as soon as the processing unit 110 receives the initial audio signal 112 from the audio player 102 so that the sensor 108 may detect the amplified audio signal 114. In another embodiment, the processing unit 110 receives the given time at which the initial audio signal 112 is to be played back from the audio player 102 or a server and triggers the activation of the sensor 108 at the given time to detect the amplified audio signal 114. In a further embodiment, the sensor 108 is always activated. IN still another embodiment, the sensor 108 is periodically activated at predetermined time points for a predetermined period of time.

While in the illustrated embodiment, the processing unit 110 is connected to the audio player 102 for receiving the initial audio signal 112 therefrom, it should be understood that the processing unit 110 may not be connected to the audio player 102 and may receive the initial audio signal 112, and optionally the given time at which the initial audio signal 112 is to be played back, from a device other than the audio player 102 such as a server.

In one embodiment, the sensed audio signal 116 comprises information about the status of the speaker 106, such as the powering state, the set volume and/or the like.

Figure 2:
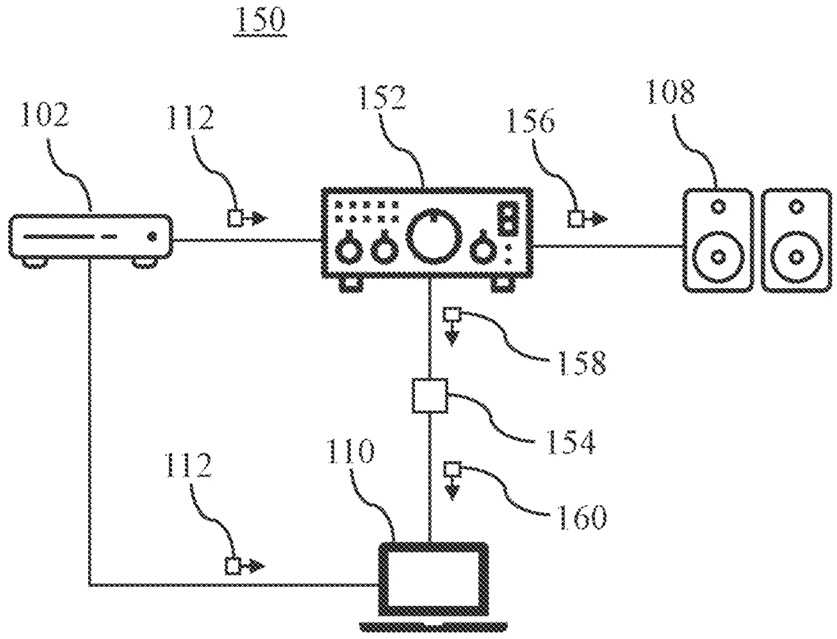
FIG. 2 is a diagram of a system for monitoring audio signals, in accordance with a second non-limiting embodiment.

While the system 100 comprises a sensor 108 for measuring the amplified audio signal 114 propagating along the connection between the audio amplifier 104 and the speaker 106, FIG. 2 illustrates one embodiment of a system 150 in which the amplified audio signal is obtained from an output of the audio amplifier.

The system 150 comprises the audio player 102, an audio amplifier 152, the speaker 106, a sensor 154 and the processing unit 110.

As described above, the audio player 102 is configured for generating the initial audio signal 112 to be played back. The audio amplifier 152 is configured for receiving the initial audio signal 112 and amplifying the initial audio signal 112 to obtain the amplified audio signal 156, 158. In this embodiment, the audio amplifier 152 comprises two outputs from which the amplified audio signal 156, 158 is outputted. It should be understood that the amplified audio signals 156 and 158 are identical and both correspond to the initial audio signal 112 that has been amplified by the audio amplifier 152 in a similar manner. The first amplified audio signal 156 is outputted via the first output of the audio amplifier 152 and the second amplified audio signal 158 is outputted via the second output of the audio amplifier 152. The speaker 106 is connected via a first connection to the first output of the audio amplifier 152 to receive the first amplified audio signal 156 therefrom while the sensor 154 is connected via a second connection to the second output of the audio amplifier 152 to receive the second amplified audio signal 158. It should also be understood that the first and second amplified audio signals 156 and 158 are outputted by the audio amplifier 152 substantially concurrently in addition to being substantially identical.

In this illustrated embodiment, the sensor 154 comprises an analog-digital converter for converting the analog amplified audio signal 158 outputted by the second output of the audio amplifier 152 into a digital audio signal 160 which is representative of the amplified audio signal 158 and transmitted to the processing unit 110. The processing unit 110 operates as described above with respect to system 100.

The person skilled in the art will understand that similarly to the system 100, the system 150 allows for the measurement of the amplified audio signal substantially concurrently with its playback.

While the above-described embodiments, the audio player 102 and the audio amplifier 104, 152 are connected together via a wired connection such as a cable, the person skilled in the art will understand that the audio player 102 and the audio amplifier 104, 152 may be wirelessly connected together using Wi-Fi™, Bluetooth™, Zigbee™ or the like. In this case, the initial audio signal 112 is transmitted wirelessly to the audio amplifier 104, 152. Similarly, the audio player 102 and the processing unit 110 may be wirelessly connected together so that the initial audio signal 112 be wirelessly transmitted to the processing unit 110.

While in the illustrated embodiments the audio player 102 and the processing unit 110 are separate devices, it should be understood that the audio player 102 and the processing unit 110 may be integral so form a single device or be modules of a same device such as a computing device.

Figure 3:
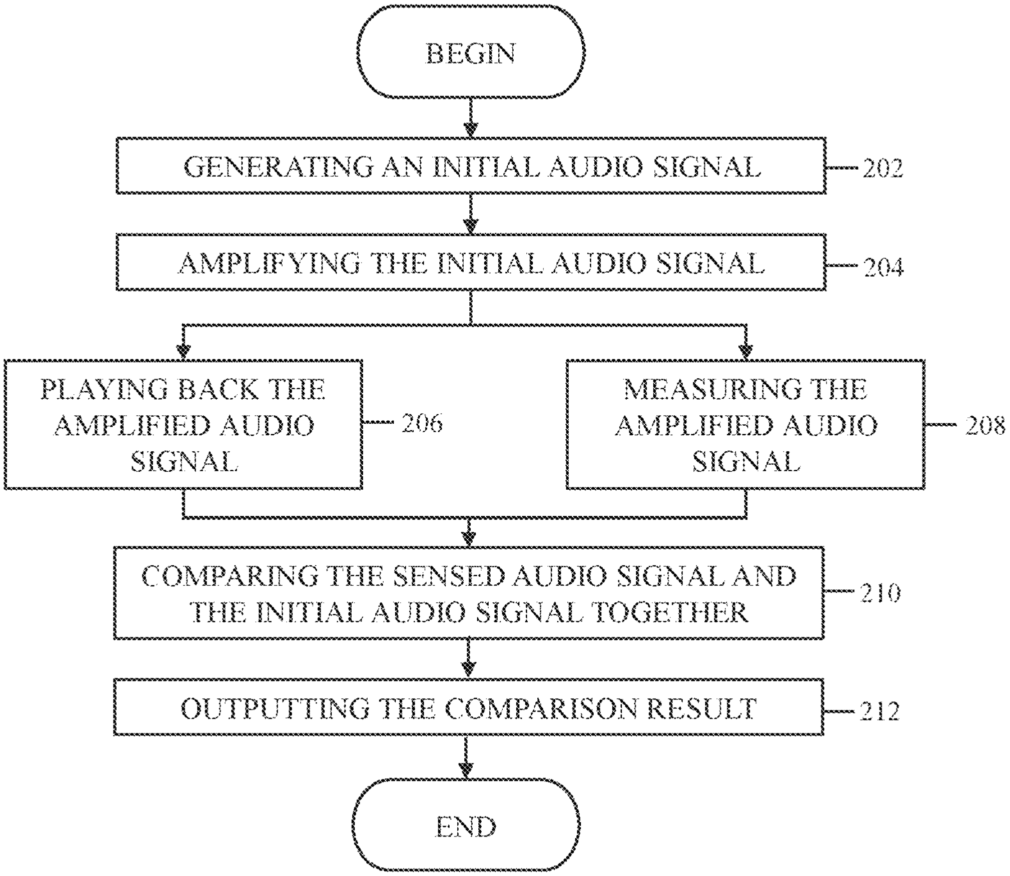
FIG. 3 is a flowchart of a method for monitoring audio signals, in accordance with a first non-limiting embodiment.

FIG. 3 illustrates one embodiment of a method 200 for playing back an audio signal and monitoring the played back audio signal.

At step 202, an initial audio signal is generated by audio player such as audio player 102. As described above, the step of generating the initial audio signal may comprise receiving the initial audio signal from a server. In another embodiment, the step of generating the initial audio signal may comprise the step of retrieving the initial audio signal from a database comprising pre-recorded audio signals. As described above, the transmission of the initial audio signal for amplification may be performed according to a playback schedule indicating the time at which an initial audio signal is to be played back.

At step 204, the initial audio signal is amplified by an audio amplifier such as audio amplifier 104, 152, thereby obtaining an amplified audio signal which is transmitted to at least one speaker.

At step 206, the amplified audio signal is transmitted to a speaker such as speaker 106 and played back by the speaker.

At step 208, the amplified audio signal while being transmitted to the speaker is detected by a sensor, thereby obtaining a sensed audio signal.

It should be understood that the steps 206 and 208 are performed substantially concurrently so that the sensed audio signal corresponds to the audio signal that is being played back.

At step 210, the sensed audio signal and the initial audio signal are compared together, thereby obtaining a comparison result as described above.

At step 212, the comparison result is outputted. For example, the comparison result may be stored in memory. In another example, the comparison result may be transmitted to a device such as the audio player or a server.

In one embodiment, step 210 consists in determining whether the sensed audio signal corresponds to the initial audio signal. For example, the spectral components of audio signals may be compared to determine whether two audio signals are substantially identical or substantially correspond to one another. When it is determined that the sensed audio signal substantially corresponds to the initial audio signal, an indication of a match may be outputted. Alternatively, when it is determined that the sensed audio signal does not correspond to the initial audio signal, an indication of a mismatch may be outputted.

In another embodiment, the comparison result comprises a comparison score of which the value is indicative of the resemblance or match of the two audio signals, as described above.

In one embodiment, the comparison score is indicative of the intelligibility of the amplified audio signal. In one embodiment, the comparison score is obtained by using a short-time objective intelligibility (STOI) method, as described above.

In one embodiment, step 208 is performed using an analog-digital converter.

In one embodiment, step 208 is performed using a current transformer. In this case, the method 200 may further comprise a step of converting the sensed analog signal into a digital signal.

In one embodiment, step 208 is performed using a split-core transducer. In this case, the method 200 may further comprise a step of converting the sensed analog signal into a digital signal.

In one embodiment, the method 200 further comprises a step of modifying at least one control parameter of the amplification of the initial audio signal based on the determined comparison score, as described above.

In one embodiment, the method 200 further comprises modifying a content of a next initial audio signal to be played back based on the comparison result. In one embodiment, the modification of the next initial audio signal to be played back is performed when the comparison score is less than a predefined value.

Figure 4:
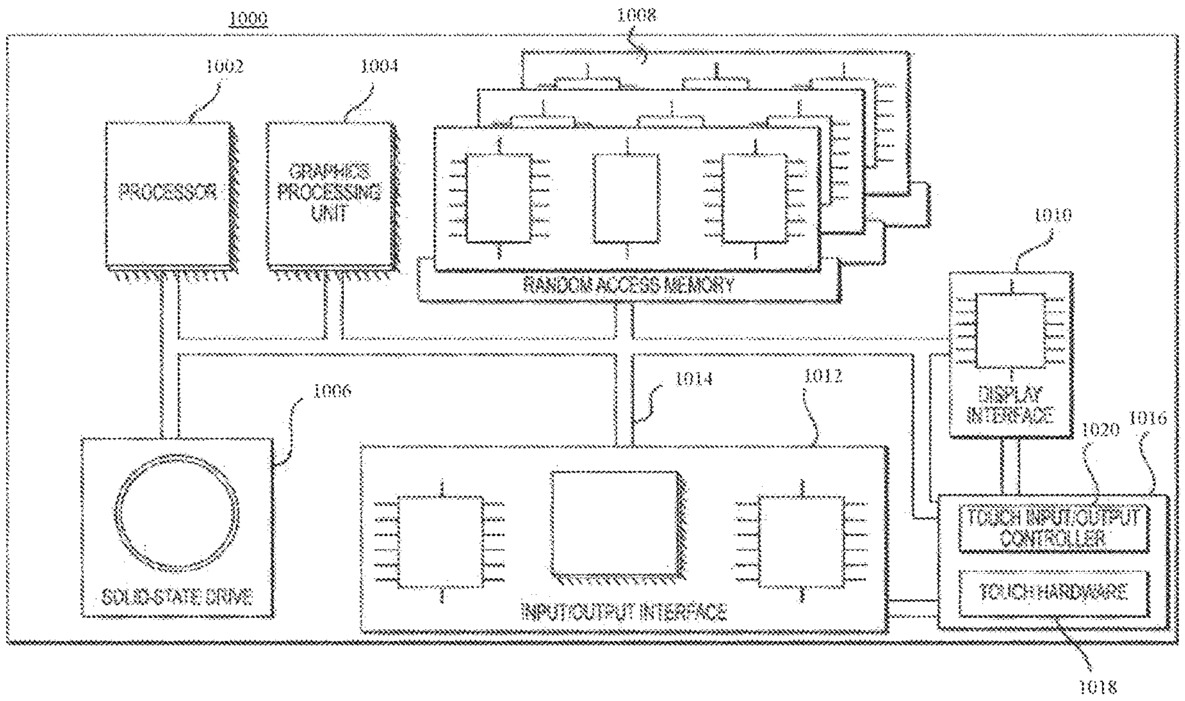
FIG. 4 is a schematic diagram of an electronic device in accordance with one or more non-limiting embodiments of the present technology.

Referring to FIG. 4, there is shown an exemplary electronic device 1000 suitable for use with some implementations of the present technology, the electronic device 1000 comprising various hardware components including one or more single or multi-core processors collectively represented by processor 1002, a graphics processing unit (GPU) 1004, a solid-state drive 1006, a random access memory 1008, a display interface 1010, and an input/output interface 1012.

Communication between the various components of the electronic device 1000 may be enabled by one or more internal and/or external buses 1014 (e.g., a PCI bus, universal serial bus, IEEE 1394 "Firewire" bus, SCSI bus, Serial-ATA bus, etc.), to which the various hardware components are electronically coupled.

The input/output interface 1012 may be coupled to a touchscreen 1016 and/or to the one or more internal and/or external buses 1014. The touchscreen 1016 may be part of the display. In one or more embodiments, the touchscreen 1016 is the display. The touchscreen 1016 may equally be referred to as a screen 1016. In the embodiments illustrated in FIG. 4, the touchscreen 1016 comprises touch hardware 1018 (e.g., pressure-sensitive cells embedded in a layer of a display allowing detection of a physical interaction between a user and the display) and a touch input/output controller 1020 allowing communication with the display interface 1010 and/or the one or more internal and/or external buses 1014. In one or more embodiments, the input/output interface 1012 may be connected to a keyboard (not shown), a mouse (not shown) or a trackpad (not shown) allowing the user to interact with the electronic device 1000 in addition or in replacement of the touchscreen 1016.

According to implementations of the present technology, the solid-state drive 1006 stores program instructions suitable for being loaded into the random-access memory 1008 and executed by the processor 1002 and/or the GPU 1004 for monitoring audio signals. For example, the program instructions may be part of a library or an application.

The electronic device 1000 may be implemented as a server, a desktop computer, a laptop computer, a tablet, a smartphone, a personal digital assistant, or any device that may be configured to implement the present technology, as it may be understood by a person skilled in the art.

In one embodiment, the above-described system 100, 150 and method 200 may be used for playing back regular audio content within a given environment such as a store, a grocery store, a mall, an airport, a waiting room, etc. The regular audio content may be list of songs, the content broadcasted by a radio station, etc. The audio player is further configured for generating additional audio content to be played back, i.e. the above-described initial audio signals. An initial audio signal may be an announcement, an audio advertisement, etc. As a given point in time such as at a predefined point time, the system may stop playing back the regular content and play back an initial audio signal such as an audio advertisement. For example, a client may pay for advertisements to be played back into a given environment. The present system therefore allows for ensuring that the audio advertisement was actually played back, and optionally determining the quality of the playback of the advertisement, i.e., ensuring that the playback of the advertisement was intelligently heard by people located within the given environment.

The embodiments of the technology described above are intended to be exemplary only. The scope of the present technology is therefore intended to be limited solely by the scope of the appended claims.

We claim:

1. A system for monitoring audio signals, the system comprising:

an audio player for generating an initial audio signal to be played back;

an audio amplifier for receiving the initial audio signal and amplifying the initial audio signal to obtain an amplified audio signal;

a speaker for playing back the amplified audio signal;

a sensor for measuring the amplified audio signal concurrently to said playing back the amplified audio signal in order to obtain a sensed audio signal, the sensor being attachable to a sheath of an electrical cable connecting the audio amplifier and the speaker together for measuring the amplified audio signal propagating along the electrical cable; and a processing unit for:

comparing the sensed audio signal and the initial audio signal together to obtain a comparison result; and outputting the comparison result.

2. The system of claim 1, wherein the audio player comprises a memory containing a plurality of pre-recorded audio signals and the audio player is configured for selecting the initial audio signal from the plurality of pre-recorded audio signals.

3. The system of claim 1, wherein the sensor comprises an analog-digital converter.

4. The system of claim 1, wherein the sensor comprises a current transformer.

5. The system of claim 4, wherein the sensor comprises a split-core transducer.

6. The system of claim 1, wherein said comparing the sensed audio signal and the initial audio signal comprises comparing a first spectral content of the sensed audio signal and a second spectral content of the initial audio signal.

7. The system of claim 1, wherein the comparison result comprises a comparison score.

8. The system of claim 7, wherein said comparing is performed using an intelligibility algorithm to obtain the comparison score.

9. The system of claim 8, wherein the intelligibility algorithm comprises a short-time objective intelligibility algorithm.

10. The system of claim 1, wherein the audio player is further configured for receiving the comparison result from the processing unit and modifying a content of at least one of the initial audio signal and a further audio signal to be played back based on the comparison result.

11. The system of claim 7, wherein one of the audio player and the processing unit is further configured controlling the audio amplifier based on the comparison result.

12. A method for monitoring audio signals, the method comprising:

generating an initial audio signal to be played back;

amplifying the initial audio signal using an audio amplifier, thereby obtaining an amplified audio signal;

concurrently playing back the amplified audio signal using a speaker and measuring the amplified audio signal while propagating along an electrical cable connecting the audio amplifier and the speaker together, thereby obtaining a sensed audio signal, said measuring being performed by a sensor attached to a sheath of the electrical cable;

comparing the sensed audio signal and the initial audio signal together, thereby obtaining a comparison result; and outputting the comparison result.

13. The method of claim 12, wherein said generating is performed by selecting the initial audio signal from a plurality of pre-recorded audio signals.

14. The method of claim 12, wherein said measuring is performed using a current transformer.

15. The method of claim 14, wherein said measuring is performed using a split-core transducer.

16. The method of claim 12, wherein said comparing the sensed audio signal and the initial audio signal comprises comparing a first spectral content of the sensed audio signal and a second spectral content of the initial audio signal.

17. The method of claim 12, wherein the comparison result comprises a comparison score.

18. The method of claim 17, wherein said comparing is performed using an intelligibility algorithm to obtain the comparison score.

19. The method of claim 18, wherein the intelligibility algorithm comprises a short-time objective intelligibility algorithm.

20. The method of claim 12, further comprising one of:

modifying a content of at least one of the initial audio signal and a further audio signal to be played back based on the comparison result; and controlling said amplifying the initial audio signal based on the comparison result.

* * * * *